UNITED STATES PATENT OFFICE.

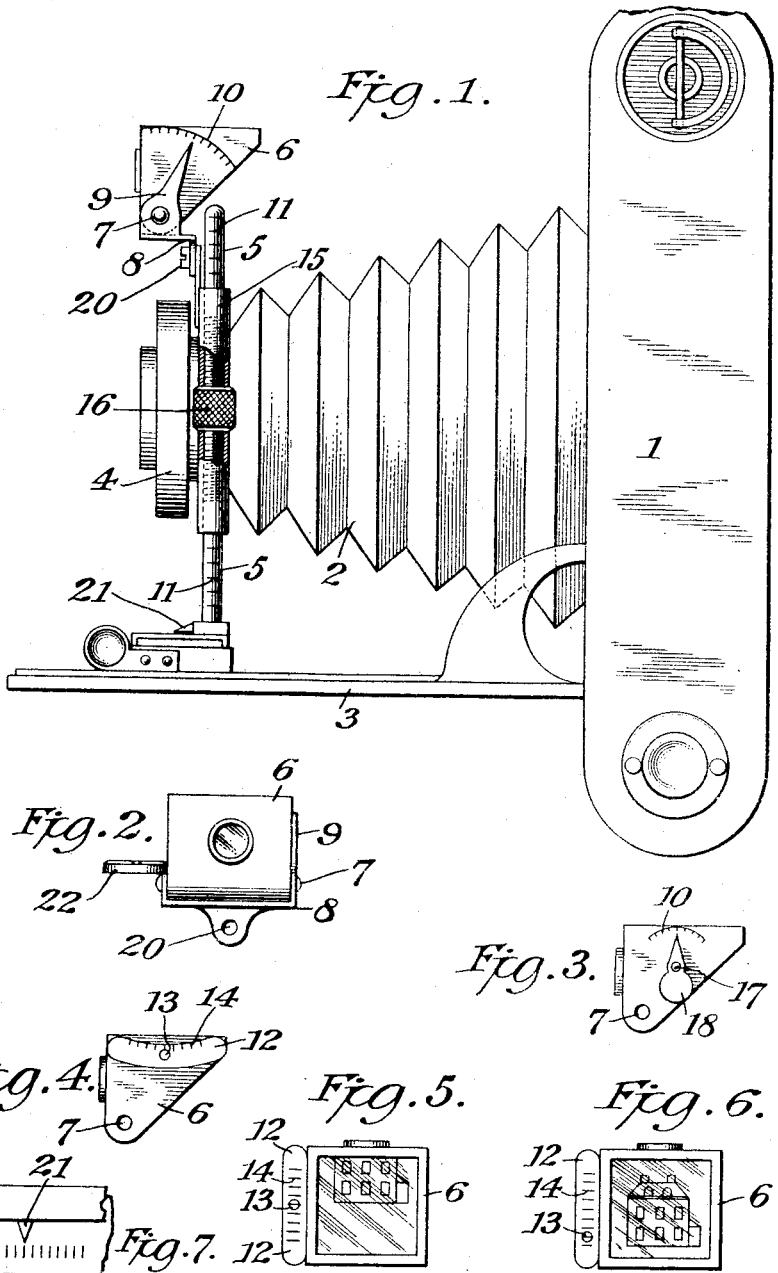

STANLEY BROWN, OF GARDEN CITY, NEW YORK.

FINDER FOR CAMERAS.

1,210,896.  Specification of Letters Patent.  Patented Jan. 2, 1917.

Application filed January 20, 1915. Serial No. 3,213.

*To all whom it may concern:*

Be it known that I, STANLEY BROWN, a citizen of the United States, and a resident of the city of Garden City, county of Nassau, and State of New York, have invented certain new and useful Improvements in Finders for Cameras, of which the following is a specification.

It is the purpose of this invention to provide cameras which have a movable lens with a pivoted or hinged finder supplied with a scale and pointer, so that the degree of tilting or inclination of the finder relative to the horizontal may be determined and to provide also the movable lens or its frame with a scale and pointer which shall conform to, or be harmonious with that on the finder, so that the photographer may be enabled to accurately determine the position to which the movable lens frame shall be moved in order to properly bring the subject to be photographed upon the exposure surface of the camera without the necessity of replacing the sensitive film or plate with a ground glass plate or its equivalent, as heretofore.

In the drawings hereof, Figure 1 is a side elevation of a folding camera of a well known type embodying the invention; Fig. 2 is a front view of the finder; Fig. 3 is a side view of the finder showing a modified construction of pointer; Figs. 4, 5 and 6 are views indicating modifications embodying a leveling *i. e.* gravitation device; Fig. 7 is a plan view of the index upon the lens-carrying frame adapted to use when the camera is upon its side.

In the drawings 1 represents the body of the camera, 2 the bellows, 3 the drop front, 4 the lens frame, 5 the supports upon which the lens frame moves, 6 the finder which is pivoted at 7 so as to be adapted to tilting forwardly and backwardly, 8 a bracket or equivalent support for the finder, 9 a fixed pointer rigidly supported by or forming part of the bracket 8, or attached to some other suitable fixed part of the apparatus, 10 a scale upon the side of the finder which properly co-acts with a pointer 9.

11 are markings upon the fixed uprights upon which the lens frame slides and which correspond with the scale 10 upon the side of the finder. Instead of the pointer 9 and scale 10, a level 12 (see Figs. 4, 5 and 6) which may be of the bubble, shot or other suitable construction, may be employed to determine the degree to which the finder is tilted. It will of course be provided with a scale or markings 14 which may be upon the side or top of the level. On the assumption that in this instance a shot level is used, the shot is shown at 13.

It will be noted that the tube or guide for the level is curved. This is essential for well known reasons, but if a bubble level is used, then the curvature of the tube or guide will be the reverse of that shown in Fig. 4.

15—16 are sliding tubes and threaded thumb-piece respectively, which co-act with threads upon the uprights 5 for accurately adjusting the lens. Of course equivalent constructions may be used.

The camera may beneficially be provided with another level shown at 22 (see Fig. 2). It should preferably be of the usual circular form and may be supported on any suitable part of the apparatus, but preferably upon the bracket which supports the finder.

The operation is as follows: The photographer finds his subject in the finder as usual, the camera being meantime held in a horizontal position, which the photographer quickly and accurately determines by observing the level 22. If he finds the subject properly located on the finder with the camera in its then position, he proceeds to make the exposure. If he finds the subject is not properly present upon the field of the finder, but on the contrary, is offset as is the representation of the house in Fig. 5, for example, then in order to bring it to the proper position, as illustrated in Fig. 6, he tilts the finder upon its pivot 7 forwardly or rearwardly as the case may require, and then while the camera as a whole is held in horizontal position, as indicated by the camera level, he notes the degree of divergence indicated by the pointer 9 and the scale upon the finder, or by the finder level as the case may be, and thereupon adjusts the lens upwardly or downwardly to correspond with the inclination of the finder, being assured of accuracy in so doing by using the index upon the fixed supports for the lens frame and making them read correspondingly with the scale on the finder or on the finder level.

In order that the camera may be used in horizontal instead of vertical position, in other words, on its side, as ordinarily expressed, the finder bracket 8 is adapted to be rotated upon its pivot 20 throughout ninety degrees and that the lens may be properly adjusted when the camera is in this position, an additional scale 11' is provided upon some fixed and normally horizontal part of the apparatus as shown in Fig. 7, 21 being the pointer therefor which moves with a slidable portion of the lens carrying frame, so that when the camera is used in a horizontal position, the finder, as stated, having been rotated through ninety degrees, will have the proper presentation, and then the index 11', co-acting with the pointer 21, will be brought into operation instead of the index 11 and the part which co-acts with it.

In Fig. 3 I show a construction in which the pointer instead of being fixed is pivoted as at 17 and provided with a weighted lower part 18, so that as the finder is tilted, the pointer will automatically under the action of gravity, shift its position and point to the proper indications upon the scale 10.

It will be obvious to those who are familiar with such matters that the essence of this invention is that the degree to which the camera lens should be offset, that is to say: moved vertically relative to the axis of the camera, to accomplish the results above referred to, can be accurately determined by the levels or gravitation devices provided for the finder, the subject as seen in the finder showing the operator to what extent the camera lens should be so offset; and it will be equally obvious that although a pivoted finder is a desirable form because the camera may then permanently remain in horizontal position, still the invention will be equally present if the finder be a non-pivoted one which, however, will necessitate tilting of the camera as a whole, the operation being that the camera will be tilted until the desired view be found in the finder, whereupon the optical divergence, that is to say, the degree of angular departure from the horizontal, being determined by the scale of the gravitation device, whatever its form may be, the camera will be returned to the horizontal and the camera lens then vertically offset to the degree determined by the scale on the gravitation device. The exposure may then be effected.

I claim:

1. In a camera having a vertically movable lens, a finder provided with a gravitation device having a coöperative reference scale to ascertain the optical divergence, i. e., the angular departure from the horizontal of the subject to be included in the negative, and a corresponding scale and pointer on the camera lens supporting mechanism to determine the necessary vertical offsetting of the camera lens relative to the normal axis of the camera.

2. In a camera having a vertically movable lens, a tilting finder provided with a gravitation device having a coöperative reference scale to ascertain the optical divergence, i. e., the angular departure from the horizontal of the subject to be included in the negative and a corresponding pointer and scale on the camera lens supporting mechanism to determine the necessary vertical offsetting of the camera lens relative to the normal axis of the camera.

In testimony whereof I have signed my name to this specification in the presence of two subscribing witnesses.

STANLEY BROWN.

Witnesses:
F. M. DAUSBACH,
CORNELIUS P. MCLAUGHLIN.